Sept. 3, 1957 E. W. WEITZEL 2,805,276

HIGH-FREQUENCY TRANSMISSION CABLES

Filed June 22, 1951

INVENTOR
E. W. WEITZEL
BY [signature]
ATTORNEY

United States Patent Office 2,805,276

Patented Sept. 3, 1957

2,805,276

HIGH-FREQUENCY TRANSMISSION CABLES

Edward W. Weitzel, Hickory, N. C., assignor to Western Electric Company, Incorporated, New York, N. Y., a corporation of New York Application June 22, 1951, Serial No. 232,957

2 Claims. (Cl. 174—113)

This invention relates to high-frequency transmission cables, and more particularly to multiconductor communications cables known as video cables.

Among the primary factors to be considered in designing video cables, are flexibility, and transmission characteristics suitable for carrying the high frequencies employed for frequency modulation and television broadcasts. Since these cables are conventionally used to connect an antenna to a receiver, or to connect a mobile television camera to a broadcasting station, such flexibility is essential in order to facilitate installation, adjustment and removal of the cables. Since these cables may also be connected to a permanently installed coaxial transmission cable, it is important that the transmission characteristics of such video cables be commensurate with the quality of these characteristics possessed by the coaxial cables.

In a cable having paired conductors, the spacing between the paired conductors must remain substantially constant throughout the length of the cable in order to provide a constant impedance. Furthermore, it is manifestly desirable that the video cables be inexpensive, simple in construction and easily manufactured. The structure of video cables heretofore proposed have satisfied some of these requirements, but there has existed a need for a video cable presenting a composite of all of these desirable characteristics.

An object of the present invention is to provide new and improved high-frequency transmission cables.

Another object of the invention is to provide new and improved multiconductor communications cables.

A high-frequency transmission cable illustrating certain features of the invention may include an elongated tube constructed of a normally solid polymer of ethylene having a cellular structure characterized by a substantial volume of occluded gas confined within a multiplicity of cells which are uniformly distributed throughout the ethylene polymer structure, and a plurality of equidistantly spaced electrically conductive strands embedded in opposite walls of the tube and extending longitudinally therealong.

A complete understanding of the invention may be had from the following detailed description of products forming specific embodiments thereof, when read in conjunction with the appended drawing, in which.

Figure 2:
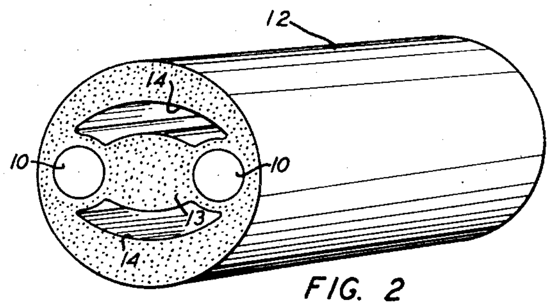
Fig. 2 is a corresponding view of the cable illustrated in Fig. 1, shown at the completion of the manufacturing method.
Figure 3:
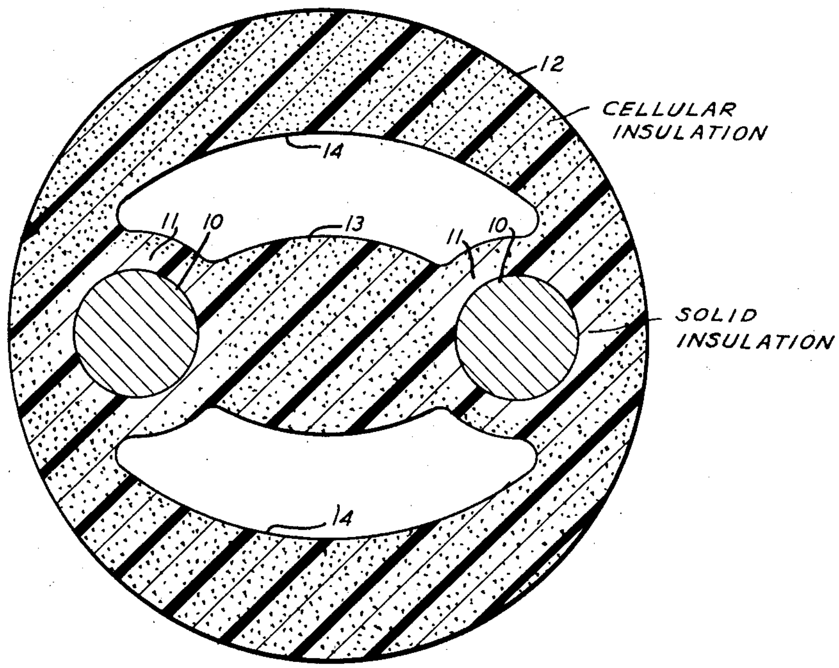
Fig. 3 is an enlarged transverse section of the cable shown in Fig. 2.

Referring now to Figs. 2 and 3, there is shown a video cable having a pair of equidistantly spaced elongated conductors 10—10, provided with individual insulating coverings 11—11 composed of solid polyethylene. The covered conductors 10—10 are embedded within opposite sides of a coextensive tube 12 having a diametrical bridge 13 extending between the covered conductors. The tube 12 and the bridge 13 are composed of a cellular or aerated form of polyethylene, which is formed in a manner hereinafter described. The solid polyethylene coverings 11—11 may gradually blend into the cellular polyethylene of the tube and the bridge, so that an intermediate portion may appear cellular to a lesser degree. The diametrical bridge 13 is continuously interposed between the covered conductors 10—10 throughout the length of the tube 12, thereby forming a pair of parallel elongated cavities 14—14, which are filled with a gas, such as air.

The diametrically bridged tube 12 of cellular polyethylene possesses sufficient flexibility to permit the cable as a whole to be readily manipulated, yet this structure is effective to maintain a substantially constant distance between the parallel conductors 10—10 throughout their lengths, and the cable can be readily bent or twisted without collapsing or becoming unduly distorted.

The cellular polyethylene constituting the walls of the tube 12 and the bridge 13, consists of a normally solid polymer of ethylene having a substantial amount of occluded gas contained within a multiplicity of minute, uniformly distirbuted, discrete, gas filled cells. The relative volume of gas which may be occluded within the polyethylene tube and bridge may vary from at least about 5% up to as near to 100% as it is possible to be obtained. The necessity of having good cell wall structure may impose a limitation upon the maximum percentage of occluded gas which may be present.

A process for the manufacture of this cable may comprise the continuous extrusion of a normally solid form of polyethylene containing a blowing agent onto a moving wire passing through an extrusion die. A blowing agent, such as dinitroso pentamethylene tetramine, may be uniformly distributed upon granules of the commercially available polymers of ethylene which are to be extruded. At the die of the continuous extrusion press a temperature of about 385° F. to about 400° F. is maintained to facilitate continuous extrusion of the polymer and to insure the formation of gas by decomposition of the blowing agent. Due to such decomposition, the extruded layer of insulation increases in size after leaving the extrusion die, and the insulation is characterized by the presence of minute, uniformly distributed, discrete, gas-filled cells. At a short distance from the extrusion die, the extruded sheath may be cooled by the application of water maintained at a temperature of about 160° F.

Figure 1:
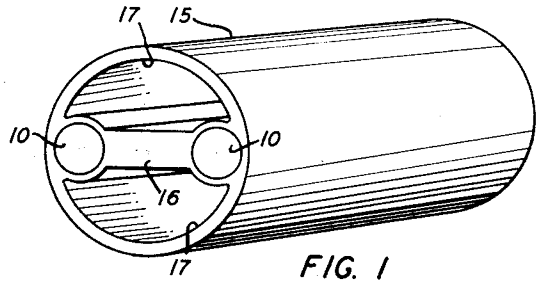
Fig. 1 is a perspective view of a multiconductor cable embodying the invention, shown during an intermediate stage of its manufacture.

In the production of the finished video cable shown in Figs. 2 and 3 of the drawings, the pair of conductive wires 10—10 are advanced in side by side, parallel relationship through a die of a continuous extrusion press (not shown). Granules of normally solid polyethylene carrying a uniformly distributed blowing agent are continuously fed to the extrusion press. A temperature of about 385° F. to about 400° F. is maintained in the vicinity of the die of the extrusion press. The extrusion press is provided with spaced internal mandrels (not shown) of such configuration that the mandrels, in cooperation with the die, cause the polyethylene containing the blowing agent to be molded about the conductors 10—10, in the manner shown in Fig. 1, to produce a solid tube 15 having a solid diametrical bridge 16 interposed between the embedded conductors 10—10. The solid bridge 16 continuously extends throughout the length of the tube 15 across a cross-sectional diameter thereof, thereby forming longitudinal cavities 17—17 of substantially semi-circular cross-section.

After leaving the heated extrusion die, the initially formed tube 15 and bridge 16 swell in all directions due to the decomposition of the blowing agent, until they have attained the proportions of the expanded tube 12 and bridge 13 shown in Figs. 2 and 3. During this metamorphosis, the initially formed substantially semicircular cavities 17—17 decrease in size, and the corners thereof become somewhat rounded, until they have the appearance of the elongated cavities 14—14 shown in Figs. 2 and 3.

The individual insulating coverings 11—11 of solid polyethylene may be simultaneously formed upon the conductors 10—10 while these conductors are passing through the die in which the initial tube 15 is formed. If the conductors 10—10 are preheated, as by continuously passing an electric current through a convenient length of the wire located in the vicinity of the extrusion die, the blowing agent in the polyethylene being extruded upon these wires will decompose in the usual manner, and cause the wires to become enveloped by a covering of polyethylene having uniformly distributed blown cells. However, if the wires are maintained at room temperature or are cooled prior to their entry into the heated extrusion die, the extruded polyethylene contacting the wires will become chilled, thereby inhibiting the action of the blowing agent. In this fashion, the initially extruded tube 15 and bridge 16 illustrated in Fig. 1 may, upon decomposition of the blowing agent, be converted into the expanded tube 12 and bridge 13 depicted in Figs. 2 and 3, while the chilled polyethylene layers 11—11 which cover the unheated wires 10—10 will remain in their compact non-expanded state. Under such circumstances, the boundary line between the non-expanded and completely expanded polyethylene will obviously not be sharp, and these two forms of insulating material may gradually blend together so that an intermediate zone may appear cellular to a lesser degree, as is best shown in Fig. 3.

Since the temperature conditions to be encountered in the service locations in which the cable may be employed, would not be expected to approach the high temperatures used in the extrusion die during manufacture, the coverings 11—11 will remain permanently non-expanded despite the continued presence of the inhibited blowing agent therein. These individual coverings of solid polyethylene could also be formed by previously extruding a thin layer of polymer free of blowing agent upon each of the wires, and then advancing such previously covered wires through the extrusion apparatus in which the mixture of polymer and blowing agent is applied. The compact coverings 11—11 contribute to the strength of the completed cable, while providing a relatively impenetrable insulating barrier immediately surrounding the individual conductors.

Figure 4:
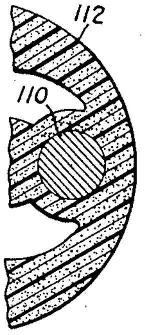
Fig. 4 is a fragmentary, transverse section of a cable in which a second embodiment of the invention is incorporated.

The above-described method in which the insulation adjacent to and covering the conductors is expanded by preheating the conductors just before they enter the extruder, results in the product illustrated in Fig. 4. In this embodiment of the invention a pair of parallel conductors, of which a conductor 110 is shown, are located on opposite sides of a bridged tube 112 having the same configuration and construction as the tube 12 illustrated in Fig. 3 for the first embodiment of the invention. However, in the tube 112 the conductors, such as the conductor 110, are embedded in and covered by cellular polyethylene, and no completely solid insulation is present.

The creation of the gas-filled cells in the polyethylene bridged tube may alternatively be effected by means other than by the procedure described herein. For example, a gas under pressure could be introduced into confined molten polymer, which may then be extruded. Methods may perhaps be utilized which employ a vacuum treatment to expand an extruded solid tube containing a volatile compound.

Although the blowing agent mentioned in the above-described method is dinitroso pentamethylene tetramine, other suitable blowing agents, such as diazoamino benzene, may be utilized with success. Organic blowing agents are preferred because inorganic agents, such as ammonium carbonate, upon decomposition form ionizable salt residues which may adversely affect the insulating properties of the dielectric sheath.

The gas initially formed by an organic blowing agent within the blown cells of expanded polyethylene may largely comprise nitrogen. However, as a result of slow diffusion in the course of time, it is likely that these cells will eventually be filled with air.

It is preferable to form a bridged tube of polyethylene having a cellular structure in which the blown cells therein are minute and non-interconnecting, in order to prevent electrical or structural breakdown thereof. Moreover, in a structure having a multiplicity in minute, completely encased cells, electrical breakdown due to infiltration of exterior moisture is avoided. It is to be understood that the terms "cells," "cellular," "expanded," "aerated" and "blown" used herein are intended to encompass discrete, i. e. non-interconnecting, voids as well as spongy or honeycomb structures in which some of the voids may be interconnected.

As its name implies, polyethylene is a polymer of ethylene and it may be made by known methods. It may possess different physical properties, depending upon the degrees of polymerization that are effected. The ethylene polymers employed are solid products which melt or soften above about 100° C. and up to about 200° C. depending upon their molecular weights, which may vary from above about 4,000 up to about 38,000. These polymers are essentially saturated compounds substantially corresponding in composition to the formula $(CH_2)_x$. An X-ray diffraction analysis of these polymers will reveal a crystalline structure. Polyethylene suitable for the purposes of this invention is readily available in the commercial chemical market.

The stability, inertness and uniformity of polyethylene render it admirably suitable for use in the continuous extrusion sheathing of electrical conductors. In its cellular form, the desirable chemical properties of this polymer are retained, while the electrical properties thereof are greatly enhanced. When a relatively large percentage of gas is present in the form of minute cells distributed throughout the polyethylene, the values of the dielectric constant and the density of the structure are substantially reduced in comparison with the values obtainable for the solid form of the polymer.

The percentage of occluded gas which may be present may range from about 25% to about 75% by volume for practical purposes. However, as has been set forth hereinbefore, the useful range of values may extend from an effective amount of slightly more than zero, which may be about 5%, up to as near to 100% as the limitations imposed by the necessity of having good cell wall structure will permit. For tested values of 50% and 58% gas content, it has been found that the dielectric constants for these structures was 1.63 and 1.53, respectively, in comparison with a value of 2.26 for the dielectric constant of solid polyethylene.

The simple construction of video cables embodying the invention renders them relatively inexpensive and easy to manufacture. As a result of the improved dielectric material and cable structure embodied in the invention, these cables admirably meet desired specifications for transmission characteristics and physical properties. Although in the illustrated embodiments the equidistantly spaced conductors appear to be straight and parallel, it is manifest that the essential concepts of the invention may be applied to a pair of equidistantly spaced uniformly intertwined conductors.

What is claimed is:

1. A communications cable for transmitting high frequency currents, which comprises an elongated hollow tube having a coextensive bridge extending across a cross-sectional diameter thereof, a pair of substantially equidistantly spaced electrical conductors embedded in the walls of the tube at opposite ends of the bridge and extending longitudinally the entire length of the tube, and an extruded, insulating sheath of a solid form of a polymer of ethylene individually covering each of said embedded conductors, said tube and said bridge consisting essentially of a cellular form of an extruded normally solid polymer of ethylene which substantially corresponds in composition to $(CH_2)_x$, shows a crystalline structure by X-ray diffraction analysis, and is characterized by a substantial volume of occluded gas confined within a multiplicity of uniformly distributed, minute, blown cells which occupy from about 25% to about 75% by volume of the tube and the bridge.

2. A communications cable for transmitting high frequency currents, which comprises an elongated hollow tube having a coextensive bridge extending across a cross-sectional diameter thereof, said tube and said bridge consisting essentially of an expanded polymer of ethylene, a pair of substantially equidistantly spaced electrical conductors embedded in the walls of the tube at opposite ends of the bridge and extending longitudinally of the tube, and an insulating sheath of a solid form of a polymer of ethylene individually covering each of said conductors.

References Cited in the file of this patent

UNITED STATES PATENTS

| | | |
|---|---|---|
| 1,305,247 | Beaver et al. | June 3, 1919 |
| 1,977,325 | Pfannkuch | Oct. 16, 1934 |
| 2,186,793 | Wodtke | Jan. 9, 1940 |
| 2,204,782 | Wermine | June 18, 1940 |
| 2,354,260 | Haney | July 25, 1944 |
| 2,480,170 | Weston | Aug. 30, 1949 |
| 2,556,224 | Scott | June 12, 1951 |

FOREIGN PATENTS

| | | |
|---|---|---|
| 82,461 | Germany | Aug. 6, 1895 |
| 397,262 | Great Britain | Aug. 24, 1933 |
| 440,596 | Great Britain | Jan. 2, 1936 |